United States Patent
Kim et al.

(10) Patent No.: US 12,493,823 B2
(45) Date of Patent: Dec. 9, 2025

(54) PREDICTION APPARATUS AND METHOD FOR N VALUE USING ARTIFICIAL INTELLIGENCE AND DATA AUGMENTATION

(71) Applicant: HYUNDAI ENGINEERING CO., LTD., Seoul (KR)

(72) Inventors: Kwang Myung Kim, Gyeonggi-do (KR); Hyuong June Park, Seoul (KR); Jae Beom Lee, Seoul (KR); Chan Jin Park, Seoul (KR)

(73) Assignee: HYUNDAI ENGINEERING CO., LTD., Seoul (KR)

( * ) Notice: Subject to any disclaimer, the term of this patent is extended or adjusted under 35 U.S.C. 154(b) by 86 days.

(21) Appl. No.: 17/775,039

(22) PCT Filed: Nov. 26, 2021

(86) PCT No.: PCT/KR2021/017665
§ 371 (c)(1),
(2) Date: May 6, 2022

(87) PCT Pub. No.: WO2022/260227
PCT Pub. Date: Dec. 15, 2022

(65) Prior Publication Data
US 2024/0152796 A1     May 9, 2024

(30) Foreign Application Priority Data
Jun. 9, 2021  (KR) .......................... 10-2021-0074703

(51) Int. Cl.
*E02D 1/00*     (2006.01)
*E02D 1/02*     (2006.01)
*G06N 20/00*    (2019.01)

(52) U.S. Cl.
CPC ............... *G06N 20/00* (2019.01); *E02D 1/02* (2013.01)

(58) Field of Classification Search
CPC .................................. G06N 20/00; E02D 1/00
See application file for complete search history.

(56) References Cited

U.S. PATENT DOCUMENTS 11,509,674 B1 * 11/2022 Beauchesne ........ H04L 63/1425
2014/0351183 A1 * 11/2014 Germain ................. E21B 44/00
706/12

FOREIGN PATENT DOCUMENTS

JP    2019-157346 A    9/2019
JP    2020-100949 A    7/2020
(Continued)

OTHER PUBLICATIONS

Juang, C. H., Pin-Sien Lin, and Tien-Hsiung Tso. "Interpretation of in-situ test data using artificial neural networks." Proceedings Intelligent Information Systems. IIS'97. IEEE, 1997. (Year: 1997).*
(Continued)

*Primary Examiner* — Shahid K Khan
(74) *Attorney, Agent, or Firm* — The PL Law Group, PLLC (57) ABSTRACT

An N-value prediction apparatus according to an embodiment of the present invention includes a hypothetical learning data augmentation unit, based on an actual N-value measured at an actual location according to the Standard Penetration Test through drilling investigation, generating at least one of hypothetical N-values corresponding to a preset hypothetical point based on the actual location, an N-value prediction model learning unit learning ground characteristic data corresponding to each of the actual location and the hypothetical point by artificial intelligence, the ground characteristic data including the actual N-value and the hypothetical N-values, and an N-value prediction result calcula-
(Continued)

tion unit predicting an N-value at an arbitrary prediction target point by using an N-value prediction model generated by artificial intelligence learning executed in the N-value prediction model learning unit.

9 Claims, 5 Drawing Sheets

(56) References Cited

FOREIGN PATENT DOCUMENTS

| JP | 6857167 B2 | 4/2021 |
| KR | 10-0419257 B1 | 2/2004 |
| KR | 10-2020-0068050 A | 6/2020 |
| KR | 10-2155101 B1 | 9/2020 |

OTHER PUBLICATIONS

European Search Report For EP21890375.5 issued on Nov. 29, 2023 from European patent office in a counterpart European patent application.
Juang C H et al., "Interpretation of in-situ test data using artificial neural networks", Intelligent Information Systems, 1997, pp. 168-172, XP010260545, DOI: 10.1109/IIS.1997.645211, ISBN: 978-0-8186-8218-6.

* cited by examiner

FIG. 2

| | | | | | | CARD OF BOREHOLE LOG | | | | Encl.No.: |
| | | | | | | Profile number BH-0 | | | | X: 5469964.16<br>Y: 5937333.89 |
| Region: Plant area | | | | | | | | Drilling system: core drilling | | |
| | | | | | | | | Ground level: 8.10 m a.s.l. | | |
| | | | | | | | | Scale 1 : 200 | | |

| Drilling | Depth of water level [m p.p.t.] | Stratigraphy | Scale [m] | Profile | Flight [m] | Lithological description | Symbol of the soil | Moisture | Condition of the soil | SPT blows |
|---|---|---|---|---|---|---|---|---|---|---|
| 1 | 2 | 3 | 4 | 5 | 6 | 7 | 8 | 9 | 10 | 11 |
| | | | | | | medium sand, yellow and brown | MSa | qm | l/md | |
| | | | | | 0.80 | medium sand, yellow and brown | | m | | 3/3/5 |
| | | | -2.0 | | 1.30 | medium sand, yellow and brown | | | | |
| | ▽▼ 3.95/3.95 | | -4.0 | | 2.00 | medium sand, dark grey interstratified coarse sand | | | | 6/7/7 |
| | | | | | | | | | | 7/8/8 |
| | | | -6.0 | | | | | | | 9/9/10 |
| | | | -8.0 | | | | MSa//CSa | m/fs | md | 9/10/12 |
| | | | -10.0 | | | | | | | 10/11/12 |
| | | | | | | | | | | 10/12/13 |
| | | | -12.0 | | 11.90 | sandy clay, dark grey with a touch of cobbles + boulders | | | | 9/10/12 |
| | | | -14.0 | | | | saCl+Co+Bo | qm | vs/s | 11/12/12 |
| | | Cowatorized | | | | | | | | 10/11/12 |
| | | | -16.0 | | 15.90 | cobbles and boulders, brown and grey | Co+Bu | | | 10/12/13 |
| | | Cowatorized | | | 16.00 | sandy clay, dark grey with a touch of cobbles + boulders | saCl+Co+Bo | | | |
| | | | -18.0 | | 17.00 | silt, dark grey | Si | qm | s | 9/10/11 |
| | ▽ 20.0 | | -20.0 | | 20.00 | medium sand, dark grey interstratified coarse sand | | | | 10/12/12 |
| | | | -22.0 | | | | | | | 20/21/23 |
| | | | -24.0 | | | | | | | 20/22/23 |
| | | | | | | | | | | 22/24/24 |
| | | | -26.0 | | | | | | | 23/24/26 |
| | | | -28.0 | | | | MSa//CSa | fs | d | 23/25/26 |
| | | | -30.0 | | | | | | | 25/27/28 |
| | | | -32.0 | | | | | | | |
| | | | -34.0 | | | | | | | 26/27/29 |
| | | | | | 35.00 | | | | | |

Verification (Test)
Comparison between predicted and measured values

FIG. 4C

3-dimentional distribution
(Predicted value + measured value)

FIG. 5

PREDICTION APPARATUS AND METHOD FOR N VALUE USING ARTIFICIAL INTELLIGENCE AND DATA AUGMENTATION

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/017665, filed Nov. 26, 2021, which claims priority to the benefit of Korean Patent Application No. 10-2021-0074703 filed in the Korean Intellectual Property Office on Jun. 9, 2021, the entire contents of which are incorporated herein by reference.

BACKGROUND

1. Technical Field

The present invention relates to a technology for identifying ground characteristics, in particular to a technology that identifies the N-value using artificial intelligence based on data augmentation.

2. Background Art

When designing a pile in the field of plant, civil engineering, and construction, it is important to accurately identify the ground characteristics. In particular, the N-value measured by the standard penetration test (SPT) is the most important factor. The standard penetration test is a test for measuring the number of necessary blows (N-value) for a cylindrical sampler called a split spoon, which is placed in the borehole formed by the drilling operation, to penetrate 30 cm into the ground using a hammer with a mass of 63.5 kg being dropped from a height of 75 cm.

Through the N-value that is calculated with this procedure, the ground characteristics can be identified, and thus the N-value becomes the most important basic data for the pile and foundation designs. However, in reality, it is difficult to identify the N-value for the whole ground of the project area with a limited drilling data given at the start of the business, errors occur in the pile design and quantity calculation due to the uncertainty of the N-value in the undrilled region, which functions as a risk factor that causes time and economic loss to the entire business.

In particular, if the drilling investigation is conducted within a short bidding period, many restriction factors such as licensing, time, cost, equipment access, and civil complaints make it difficult to conduct an overall drilling investigation. Accordingly, at the current time, the N-value at an undrilled point is only estimated by the engineer relying on his or her empirical judgement based on limited data, which leads to errors in the pile design and quantity calculation, which then becomes the cause of delays in construction and increases in cost. Thus, there is a need for a technique that enables the identification of the N values even at undrilled points with limited measured drilling data.

SUMMARY

The technical problem of the present invention hereupon was conceived in this respect, and the object of the present invention is to predict the N-value for an arbitrary undrilled point by using the limited measured N-value data identified through drilling. Accordingly, the introduction of a technique for measuring the N-value using artificial intelligence is expected, though an overall drilling investigation is difficult to be conducted due to the restriction factors stated above, thus limiting the number of the securable data sets, in which lies a practical difficulty to secure enough accuracy for the engineers to trust and use for the design. Therefore, in order to increase the given sample data sets through inputs so to improve the accuracy of the model at the stage of studying, and secure high accuracy also for variant data, the method and apparatus for prediction of N-value using artificial intelligence based on data augmentation is provided.

The apparatus for the prediction of the N-value according to an embodiment for realizing the object of the present invention includes a hypothetical learning data augmentation unit, based on an actual N-value measured at an actual location according to the Standard Penetration Test through drilling investigation, generating at least one of hypothetical N-values corresponding to a preset hypothetical point based on the actual location, an N-value prediction model learning unit learning ground characteristic data corresponding to each of the actual location and the hypothetical point by artificial intelligence, the ground characteristic data including the actual N-value and the hypothetical N-values, and an N-value prediction result calculation unit predicting an N-value at an arbitrary prediction target point by using an N-value prediction model generated by artificial intelligence learning executed in the N-value prediction model learning unit, wherein the hypothetical learning data augmentation unit uses circular augmentation where multiple hypothetical points are set up radially in a certain distance centering the actual location.

In an embodiment of the present invention, the ground characteristic data may include a location information and a soil information corresponding to the actual location and the hypothetical point.

In an embodiment of the present invention, the location information may include at least one of latitude, longitude, altitude, depth, and an absolute position based on depth and altitude.

In an embodiment of the present invention, the N-value prediction model learning unit may use an artificial intelligence learning structure constructed by at least one of automatic machine learning technique, decision tree technique, and artificial neural network technique, which contains an input layer, an output layer, and at least one hidden layer built between the input layer and the output layer, and the N-value prediction model learning unit may be repeatedly learnt by the said artificial intelligence learning structure so that the location information and the soil information corresponding to the actual location and the hypothetical point is input in the input layer, and the actual N-value or hypothetical N-value is output in the said output layer.

In an embodiment of the present invention, a learning through the artificial intelligence learning structure may select one technique with the minimum error value with the application of the Mean Absolute Percentage Error (MAPE).

In an embodiment of the present invention, the multiple hypothetical points may consist of 8 points in a radius of 0.5 m, 12 points in a radius of 1 m, and 16 points in a radius of 2 m centering around the actual location.

In an embodiment of the present invention, the N-value prediction result calculation unit may output a predicted N-value derived from the input of a location information of the prediction target point and an actual N-value at a ground corresponding to the prediction target point by using the N-value prediction model.

The method for the N-value prediction according to an embodiment for realizing the object of the present invention includes based on an actual N-value measured at an actual location according to the Standard Penetration Test through drilling investigation, generating at least one of hypothetical N-values corresponding to a preset hypothetical point based on the actual location, learning ground characteristic data corresponding to each of the actual location and the hypothetical point by artificial intelligence, the ground characteristic data including the actual N-value and the hypothetical N-values, and predicting an N-value at an arbitrary prediction target point by using an N-value prediction model generated in learning by artificial intelligence, wherein in generating at least one of hypothetical N-values, circular augmentation where multiple hypothetical points are set up radially in a certain distance centering the actual location is used.

In an embodiment of the present invention, the ground characteristic data may include a location information and a soil information corresponding to the actual location and the hypothetical point.

In an embodiment of the present invention, the location information may include at least one of latitude, longitude, altitude, depth, and an absolute position based on depth and altitude.

According to the embodiments of the present invention, the N-value at an undrilled point can be predicted, since the N-value prediction models can be derived from ground characteristic data learnt by artificial intelligence.

In addition, under the present invention, cost and time due to the drilling investigation can be reduced at the time of bidding and designing, since the N-value at an undrilled point can be predicted with the minimum number of drilling investigation results.

In addition, problems such as delays in construction and increases in cost can be reduced with an improved accuracy in design and quantity calculation of piles compared to the traditional method, in which the N-value at an undrilled point is predicted relying on the empirical judgement of the engineers.

In addition, a method and apparatus for N-value prediction for performing artificial intelligence can be provided, which ultimately improves machine learning performance by performing preprocessing operations including the data augmentation process.

However, the effects of the present invention may not be limited to the aforementioned effects, and may be variously expanded within the spirit and scope of the present invention.

DETAILED DESCRIPTION

Since the present invention may have various changes and forms, specific embodiments may be illustrated in the diagrams and described in detail in the text. However, this is not intended to limit the present invention in a specific onset form, and may be understood to include all variations within the spirit and scope of the present invention, equivalents, and substitutes.

Meanwhile, the meaning of the terms used in the present application may be understood as follows.

Terms such as "first" and "second" are to distinguish one component from another, and the scope of rights may not be limited due to these terms. For example, a first component may be named as a second component, and similarly, a second component may be named as a first component.

When a component is stated to be "connected" to another component, it may be understood that it may be directly connected to that other component, or that there may be another component in between. On the other hand, if a component is stated to be "connected directly", it may be understood that there is no component existing in between. Meanwhile, terms describing the relationship between the components, namely, "between" and "directly between" or "neighboring to" and "directly neighboring to", etc. may be understood in the same manner.

A singular expression may be understood to include the plural expression unless the context clearly expresses otherwise, terms such as "include" or "have" indicate the existence of the embodied features, numbers, steps, actions, components, parts, or combinations of these, and may be understood that the possibility of the existence or addition of one or more other features, numbers, actions, components, parts, or combinations of these is not eliminated in advance.

The present invention can be embodied as computer-readable codes in a computer-readable storage medium, and the computer-readable media include all types of storage devices in which computer-readable data is stored by computer system. Examples of computer-readable storage media are ROM, RAM, CD-ROM, magnetic tape, disk, optical data storage device, etc. In addition, the computer-readable storage media may be distributed to the computer system that is connected to network, and the computer-readable codes may be stored and executed in a distributed method.

Hereafter, preferred embodiments of the present invention will be described in further detail in reference to the drawings.

Figure 1:
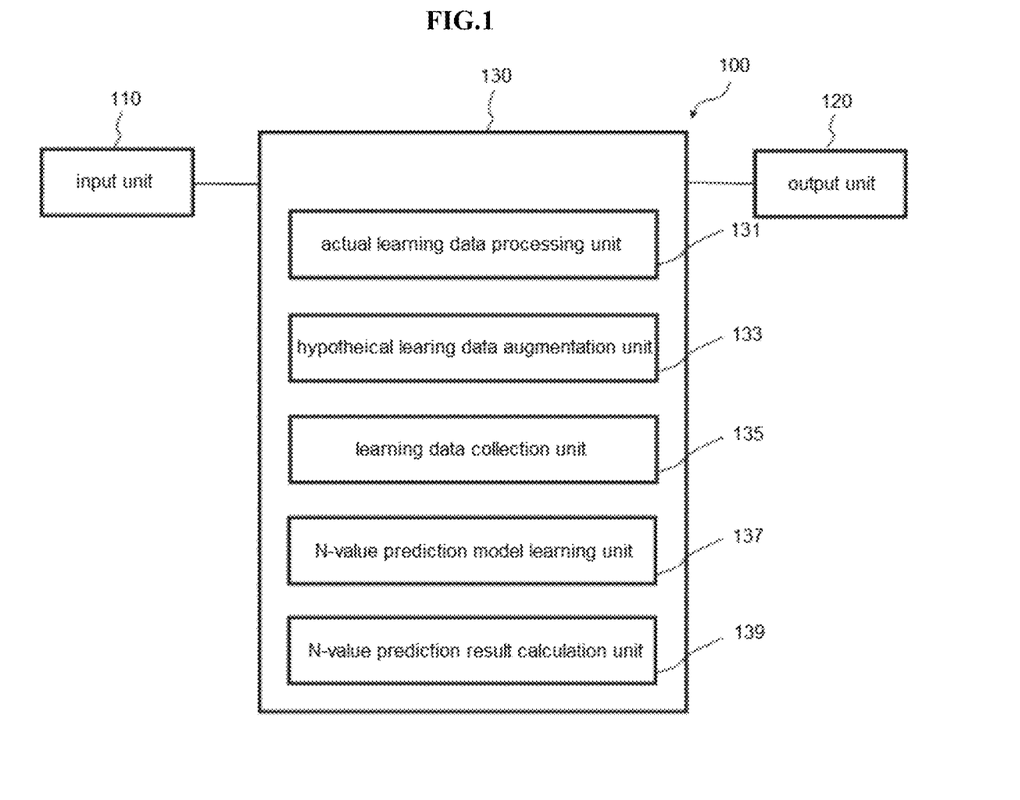
FIG. 1 is a block diagram of the structure of the N-value prediction apparatus using artificial intelligence according to an embodiment of the present invention.

FIG. 1 is a block diagram of the structure of the N-value prediction apparatus using artificial intelligence according to an embodiment of the present invention.

In reference to FIG. 1, the N-value prediction apparatus (100) using artificial intelligence according to an embodiment of the present invention is configured to predict the N-value at an arbitrary location based on the limited ground data within a certain range of area.

For example, the N-value prediction apparatus (100) for the execution of artificial intelligence may be configured to communicate with the surrounding devices such as terminals, etc. through network, and in this case, the N-value prediction apparatus (100) can receive requests for generation of learning data for the execution of artificial intelligence through the input unit (110), and can perform tasks to generate learning data for the execution of artificial intelligence in correspondence with these requests. For example, the N-value prediction apparatus (100) can be embodied in at least one cloud server that operates based on distributed computing. The N-value prediction apparatus (100) can be connected to terminals and wired network, or wireless network such as Bluetooth, Wi-Fi, etc., and can communicate with terminals through wired or wireless network.

The N-value prediction apparatus (100) may be interlocked with database (no drawing provided) and store Central Processing Unit (CPU), Graphics Processing Unit (GPU), and Tensor Processing Units (TPU) regarding at least one cloud server in relation with generating learning data for the execution of artificial intelligence, as well as resource information including memories. On the other hand, the database may be configured to be connected with the N-value prediction apparatus (100) externally through communication, or to be included internally as a database module.

The database is configured as a hardware memory device and stores the actual N-value data, which is the ground characteristic data at one or more drilling points derived from ground investigation through drilling. The actual ground characteristic data stored in the database includes the actual location information (latitude, longitude, altitude, depth, absolute position base on altitude and depth) at the point where N-value is measured, as well as the soil information at the point where N-value is measured.

In the present embodiment, altitude means the surface altitude at the drilling point, depth means the relative depth from the surface of the actual N-value measurement point. Alternatively, the calculation of altitude and depth can be substituted and stored as the absolute position of the actual measurement point instead.

Figure 2:
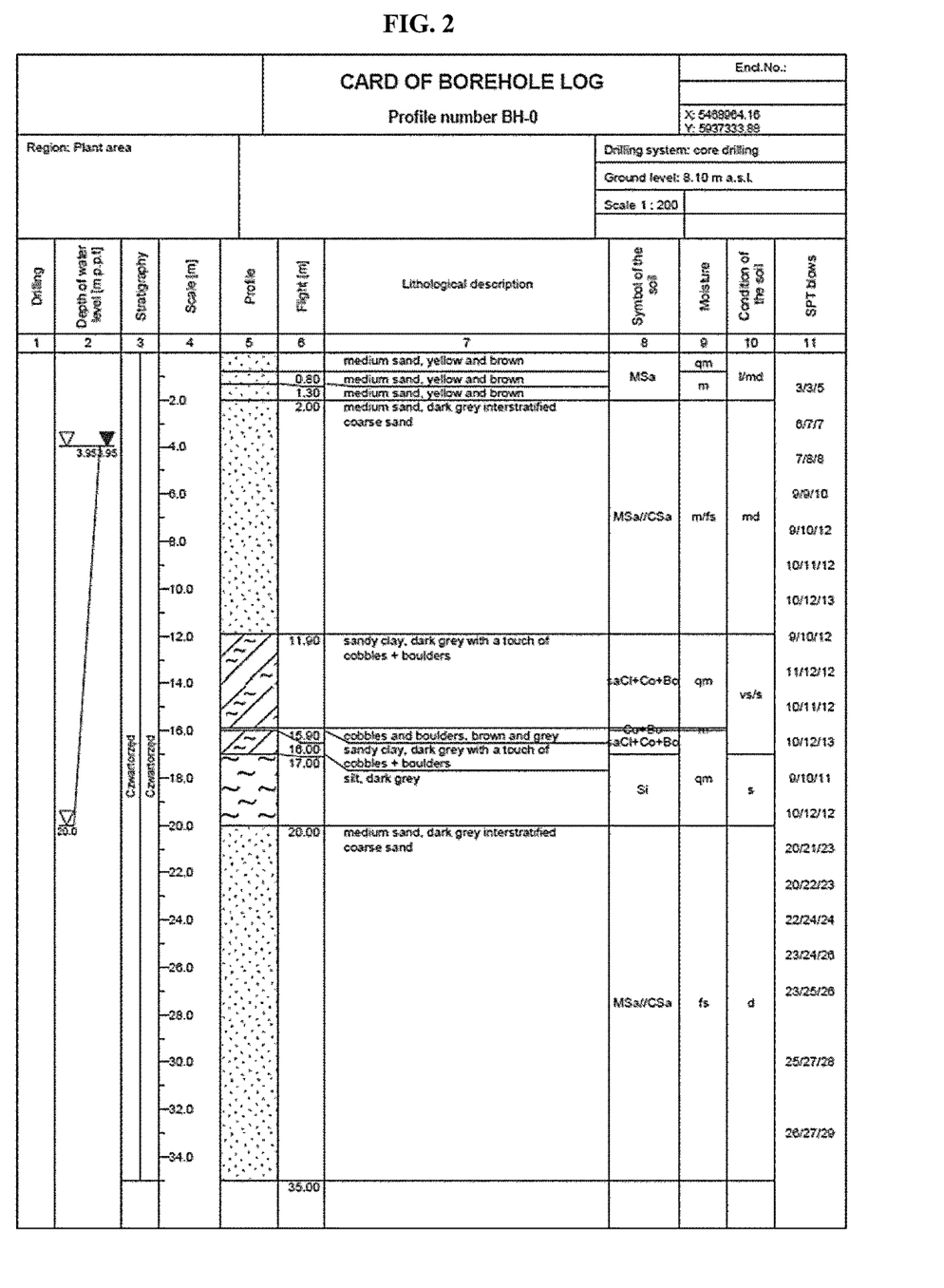
FIG. 2 shows an example of the borehole log which is used in the N-value prediction apparatus illustrated in FIG. 1.

The actual N-value is measured by the standard penetration test (SPT) in the ground investigation through drilling. FIG. 2 illustrates an example of a columnar section created by a ground investigation through conventional drilling which includes standard penetration test. In reference to FIG. 2, the soil characteristics depending on the depth and the ground characteristics at the drilling point including the N-value are described. The user inputs the ground characteristics at the drilling point described on the columnar section through the input layer, the input ground characteristics are stored as actual ground characteristic data in the database by the control layer. The actual ground characteristic data stored in the database is transferred to the N-value prediction model learning layer through the control layer, and used for the artificial intelligence learning to generate N-value prediction model The N-value prediction apparatus (100), based on the input unit (110), which is used for the input of necessary data, information, and control command for the N-value prediction by the user, output unit (120) where the necessary information for prediction of the N-value, and the input data from the input unit (110), and the prediction result are output, calculates the output value for the prediction of N-value based on the artificial intelligence and generates this value to the output unit (120), and includes the control unit (130) which controls the overall operation of the N-value prediction apparatus (100).

The input unit (110) is for the user of the N-value prediction apparatus (100) to input necessary data, information, and control commands for the prediction of the N-value, and as the input unit (110), conventional input means such as a keyboard, mouse, touch screen, etc. may be used. The data or the information input through the input unit (110) is controlled by the control unit (130), converts the collected data through the DATA Augmentation into big data in the learning stage, is used in the N-value prediction model learning based on artificial intelligence, and in the application stage, it is used to generate the prediction result such as the predicted N-value based on the N-value prediction models learnt in the earlier stage.

The output unit (120) is controlled by the control unit (130) and generates the necessary information for the prediction of the N-value and the prediction result. As the output unit (120), conventional output means such as a monitor, printer, etc. may be used.

The control unit (130) is configured to control the overall operation of the N-value prediction apparatus (100) for the execution of artificial intelligence. In addition, the control unit (130) includes a processing unit for the actual learning data (131), a data augmentation unit for the hypothetical learning (133), learning data collection unit (135), N-value prediction model learning unit (137), and the N-value prediction result calculation unit (139).

Concretely, the control unit (130), in the stage of learning, based on the actual N-value and information, which are the ground characteristic data at the drilling point input by the input unit (110) derived from a drilling, controls the data flow between the processing unit for the actual learning data (131) and the learning data collection unit (135), converts the collected data into big data and controls it, as well as gets involved in the calculation of the predicted N-value and the prediction result at the N-value prediction result calculation unit (139) based on the input data.

The processing unit for the actual learning data (131) may receive actual learning data including the actual N-values, which are the ground characteristic data at a drilling point generated from drilling, and labels. Here, the actual learning data may refer to the data including the labeling information which can be used in specific learnings. In an embodiment, the processing unit for the actual learning data (131) is configured to process data labeled with the actual soil information at the actual point of the predicted N-value, and the actual location information (latitude, longitude, altitude, depth). The data is stored and controlled as actual data in the database.

The data augmentation unit for the hypothetical learning (133) may generate at least one hypothetical data through modification of the actual data based on the labeling information. Here, labeling may refer to the result value (or the estimate value) given to the labeled data. Data and labeling are used when supervised learning method is used in deep learning.

In an embodiment, the data augmentation unit for the hypothetical learning (133) may perform data augmentation (or expansion) tasks based on the actual N-value data, which is the ground characteristic data at the drilling point generated from drilling. Here, data augmentation refers to the tasks which increase the number of input data sets to secure higher accuracy at the stage of artificial intelligence (machine-learning tasks) learning, and modify the input data to secure higher accuracy with variant data, and in a broad sense, it may be included in preprocessing operations.

Figure 3:
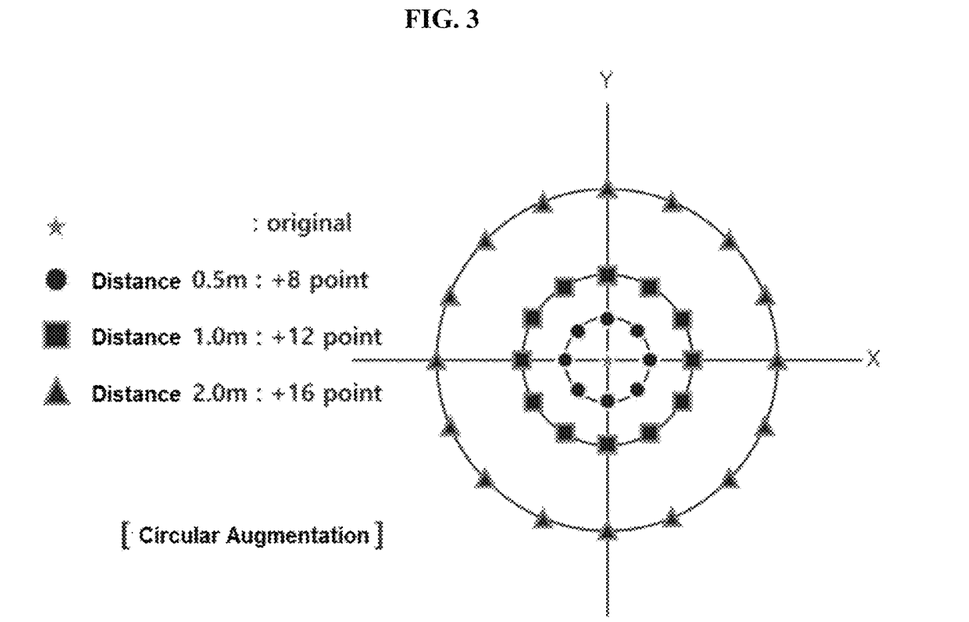
FIG. 3 is an exemplary diagram for the explanation of the circular augmentation method which is used as an example of data augmentations in accordance with drilling data.

The data augmentation task of the data augmentation unit for the hypothetical learning (133) may be described in reference to the FIG. 3.

FIG. 3 is an exemplary diagram for the explanation of the circular augmentation method which is used as an example of data augmentations in accordance with drilling data.

In reference to FIG. 3, according to an embodiment, the data augmentation unit for the hypothetical learning (133) generates at least one hypothetical data by generating a hypothetical N-value corresponding to a preset location based on the labeling information of the measured N-value. Hereat, as an example, a circular augmentation may be used in generating a hypothetical data. The circular augmentation sets up multiple hypothetical points radially, in which 8 hypothetical points in a radius of 0.5 m, 12 hypothetical points in a radius of 1 m, and 16 hypothetical points in a radius of 2 m can be set up centering around the actual borehole at the drilling point. Accordingly, 36 hypothetical N-values are additionally generated by one actual N-value in the borehole.

For example, if 16 actual N-values depending on the depths can be obtained with one borehole, 320 actual N-values may be obtained with 20 boreholes, hereby securing a total of 11,840 N-values big data in accordance with the following equation.

$$320 \times [1(\text{number of the actual } N\text{-values}) + 36(\text{number of the hypothetical } N\text{-values})] = 11{,}840$$

Accordingly, in designing of a plant structure, a structure with little error may be designed, by obtaining a large number of big data based on the actual N-value.

Namely, in an embodiment of the present invention, the data augmentation unit for the hypothetical learning (133) is configured to generate a number of hypothetical N-values in a range with small errors at each position of xyz coordinate system based on the actual location.

For example, the data augmentation unit for the hypothetical learning (133) may include multiple data augmentation modules. Each of the multiple data augmentation modules may generate corresponding hypothetical data through independent data augmentation algorithm by detecting actual N-value inputs. More specifically, the data augmentation unit for the hypothetical learning (133) may include the first data augmentation module (no drawing provided), which generates hypothetical N-values of the multiple hypothetical points radially set up in the x-y coordination system based on the actual information such as latitude, longitude, altitude, depth, soil information, etc., and the second data augmentation module (no drawing provided), which generates multiple hypothetical N-values depending on depths from the surface on the basis of the N-value distribution chart of one borehole (x-axis). In other words, based on the actual N-value, after generating hypothetical N-values (a number of 36) at the base point (for example, the surface) from the actual location in the x-y coordination system by the first data augmentation module, the hypothetical N-values (36×16=a total number of 576) depending on depths corresponding to the hypothetical N-values (a number of 36) may be generated by the second data augmentation module.

In other words, unlike sequentially applying the first and second data augmentation modules, the average value of the hypothetical N-values generated by the first and second data augmentation modules may be generated and set as the hypothetical N-value. For example, based on the actual N-value, the hypothetical N-values (a total number of 576) for each of 16 N-values, depending on depths obtained at the actual location in the x-y coordination system by the first data augmentation module, may be generated, and the average value of these values and the hypothetical N-values (a total number of 576) generated by the second data augmentation module depending on each location may be set as the final hypothetical N-value.

The data augmentation unit for the hypothetical learning (133) is described as including multiple data augmentation modules as an example, but is not limited thereto. On the contrary to this, a random value may be given within the error range depending on each location based on the actual N-value, or through learning of actual measured N-values at each hypothetical points based on artificial intelligence, and the generated models hereupon, a hypothetical N-value at each hypothetical point based on the actual N-value may be generated In an embodiment of the present invention, the data augmentation unit for the hypothetical learning (133) may accomplish the verification of the data validity referring the generated N-value through the standard artificial intelligence algorithm and include more data validity verification module (no drawing provided) which determines valid hypothetical N-value. Here, the standard artificial intelligence algorithm may refer to the algorithm that analyzes the quality of the generated hypothetical N-value and judges if it is possible for the relevant hypothetical N-value to be classified as the relevant actual learning data.

In further details, the data validity verification module, based on the standard artificial intelligence algorithm, may not determine the hypothetical N-value as a valid hypothetical N-value, if it is impossible to be classified as hypothetical data of the actual N-value, which is the actual learning data. For example, the data validity verification module may exclude the hypothetical N-values generated corresponding to the relevant hypothetical points from valid hypothetical N-values, if the generated hypothetical N-value is outside the error range, or the N-value distribution chart depending on depths of specific hypothetical points is out of a certain range from the actual N-value distribution chart depending on depths.

The learning data collection unit (135) may store hypothetical learning data with label mapping including information of each hypothetical point corresponding to at least one or more hypothetical N-value, which is a hypothetical data, in the database as learning data along with the actual N-value that are the actual learning data.

For example, the learning data collection unit (135) may generate actual learning data including data and labels, and hypothetical learning data that maps labels in at least one hypothetical data which is verified as valid data among hypothetical data, and store them as leaning data.

In an embodiment, the learning data collection unit (135) may be configured as a database module in the process of storing the generated learning data and hypothetical learning data, or store the learning data and hypothetical learning data in a separate database. The learning data collection unit (135) may transfer the stored learning data and hypothetical learning data to the N-value prediction model teaming unit (137) for them to be used for learning or modeling.

The N-value prediction model learning unit (137) lets the learning data and the hypothetical learning data stored in the database to be learnt by artificial intelligence. Due to the learning of the learning data and hypothetical learning data in the N-value prediction model learning unit, an N-value prediction model is generated.

In the present embodiment, it is described as the N-value prediction model learning unit (137) uses an artificial neural network, to which the standard error back propagation learning algorithm is applied, for learning. The learning structure of the artificial neural network may include an input layer, output layer, and at least one or more hidden layers formed between the input and output layers. In the present embodiment, latitude, longitude, altitude, depth, and soil among the 6 learning factors (latitude, longitude, altitude, depth, soil, N-value) through the input layer, and it may be repeatedly learnt so that the corresponding N-values will be output through the output layer.

The learning through the artificial neural network may be repeated as many times as the selected number derived by the application of the gradient descent method. For the optimal learning technique, among artificial neural network technique, decision tree technique, and automatic machine learning technique, the one with the minimum error value with the application of the Mean Absolute Percentage Error (MAPE) may be selected.

After the repeated learning of the learning factors by the N-value prediction model learning unit (137) is completed, the N-value prediction model may be generated.

In the present embodiment, the N-value prediction apparatus (100) is described as it includes the N-value prediction model learning unit (137), but is not limited thereto. For example, the N-value prediction model learning unit (137) may be realized by a separate device or server, and configured to be connected to the N-value prediction apparatus (100) through communication. In this case, the N-value prediction model learning unit (137) may be connected to the teaming data collection unit (135) based on remote call so to obtain learning data and hypothetical learning data.

In addition, the present embodiment uses learning through the artificial neural network as the example, but it is not limited thereto. It is certain that the decision tree technique and automatic machine learning technique may be applied as techniques of artificial intelligence.

In the decision tree technique and the automatic machine learning technique, the location information and soil information corresponding to the actual location and hypothetical points are input through the input layer, and the actual N-value or the hypothetical N-value may be learnt through the output layer.

In further details, the decision tree techniques may include techniques such as Decision Tree, Random Forest, Gradient Boosting, etc.

In addition, the automatic machine learning techniques may include a technique, in which the artificial intelligence automatically adjusts hyperparameters referring to the number of hidden layers and neurons of the artificial neural network. Stacking and Ensemble techniques, which learns through a multilayer connection of existing artificial intelligence techniques including the decision tree technique and the artificial neural network technique, or a technique which simultaneously uses automatic tuning of the Stacking, Ensemble, and hyperparameter techniques.

For example, the N-value prediction model learning unit (137) may be configured with multiple modules, and each module may apply each of the decision tree technique, artificial neural network, automatic machine learning, etc. executing the learning, and may selectively apply the optimal model after comparing each N-value prediction model generated by these modules. In this case, the optimal model may be selectively applied after applying the MAPE (Mean Absolute Percentage Error) and RMSE (Root-Mean-Square Deviation) based on the actual N-value.

In addition, the data learning method may also be based on various methods such as Machine Learning, Supervised Learning, etc., and in execution of machine learning, various artificial neural network models may be applied such as CNN, RNN, combinations thereof, etc.

The N-value prediction result calculation unit (139) is configured to calculate the predicted N-value based on the actual N-value using the N-value prediction model generated in the N-value prediction model learning unit (137). As a result of the learning of the actual N-value and the hypothetical N-value derived from data augmentation based on thereon, the predicted N-values by the N-value prediction models corresponding to the location where the actual N-value was measured are compared and the reliability of the N-value prediction model may be verified. For this, refer to FIGS. 4A to 4C.

Figure 4A:
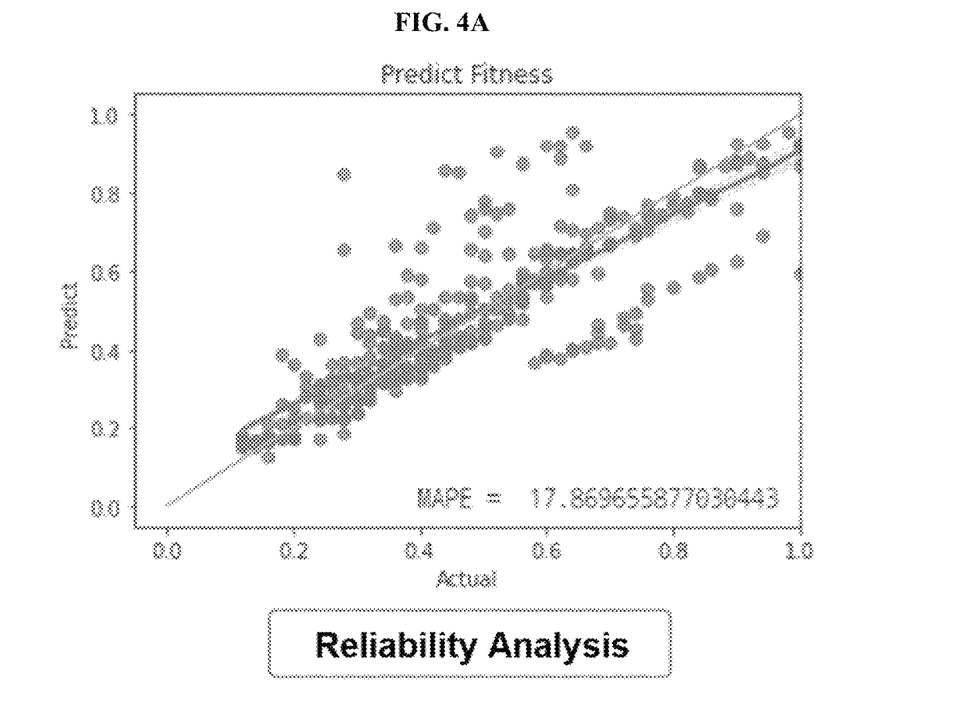
FIG. 4A to FIG. 4C show the reliability of the predicted N-value according to the N-value prediction model and the actual N-value, test, and a 3-dimensional distribution diagram.
Figure 4B:
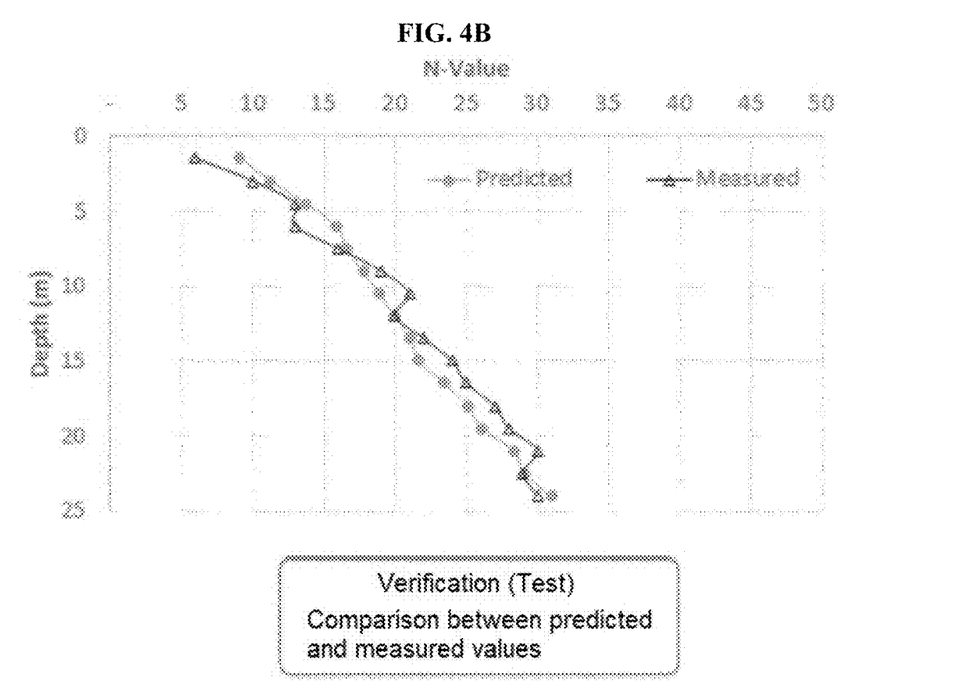
Figure 4C:
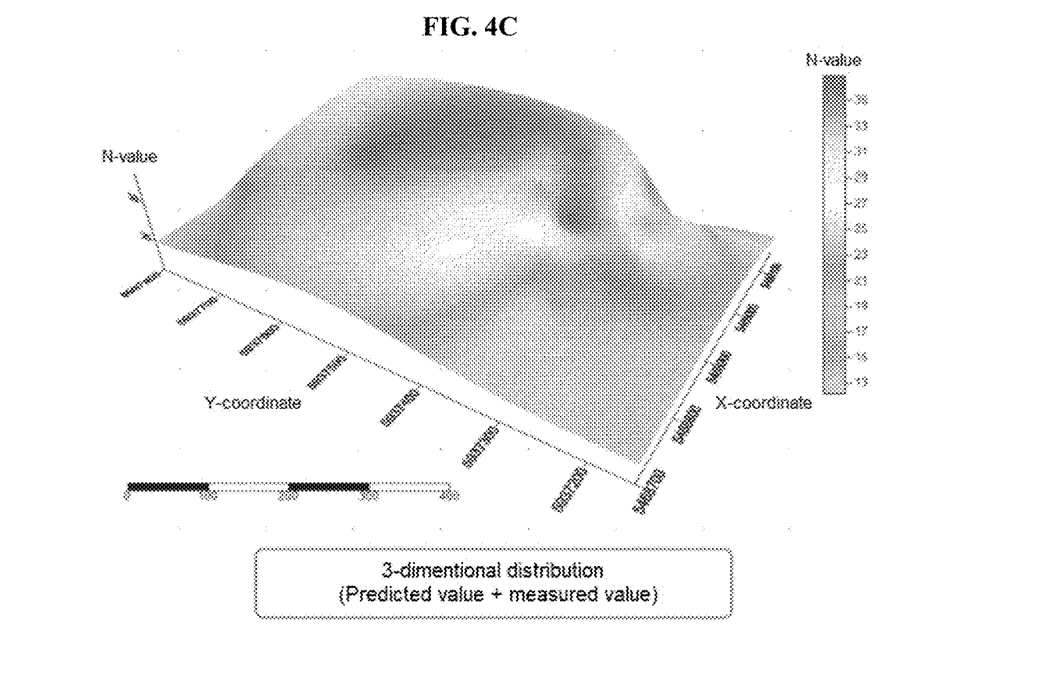

FIG. 4A to FIG. 4C show the reliability of the predicted N-value according to the N-value prediction model and the actual N-value, test, and a 3-dimensional distribution diagram.

Referring to FIG. 4A to FIG. 4C, the reliability MAPE value of the predicted N-values derived from the N-values prediction model and the actual N-values is confirmed to be 17.9% (Refer to FIG. 4A). In addition, when comparing the predicted N-values and the actual measured N-values depending on depths, they are confirmed to have similar distributions (Refer to FIG. 4B).

The N-value prediction result calculation unit (139) predicts the N-value at an arbitrary prediction point (latitude, longitude, depth). The N-value prediction result calculation unit (139) obtains the prediction condition (latitude, longitude, depth, and the soil of the ground), which is input through the input unit (110), from the control unit (130), and predicts the N-value at the predicted point, and the N-value predicted by the N-value prediction result calculation unit (139)(predicted N-value) is output through the output unit (120). The N-value prediction result calculation unit (139) may also calculate the distribution of the predicted N-values at input depths within a certain area.

FIG. 4C is a 3-dimensional N-value distribution obtained in a main structure section of a plant site using predicted N-values and standard actual N-values. Using this, the optimal arrangement of structure is possible. For example, an important structure or a structure that generates a high load may be arranged in sections with favorable ground conditions, and a less important structure or a structure that generates a low load may be arranged in sections that are relatively unfavorable.

In addition, according to the N-value prediction apparatus in accordance with the present embodiment, by improving the accuracy through data augmentation using limited actual ground characteristic data, in designing piles under the structure, direct foundations, and ground improvement, the design and quantity calculation errors may be minimized with highly reliable N-value prediction, increasing the credibility in cost and time calculation for the construction, and even at the time of bidding, the arrangement of the main structures may be accurately identified, securing the business order and a successful execution of the business.

Figure 5:
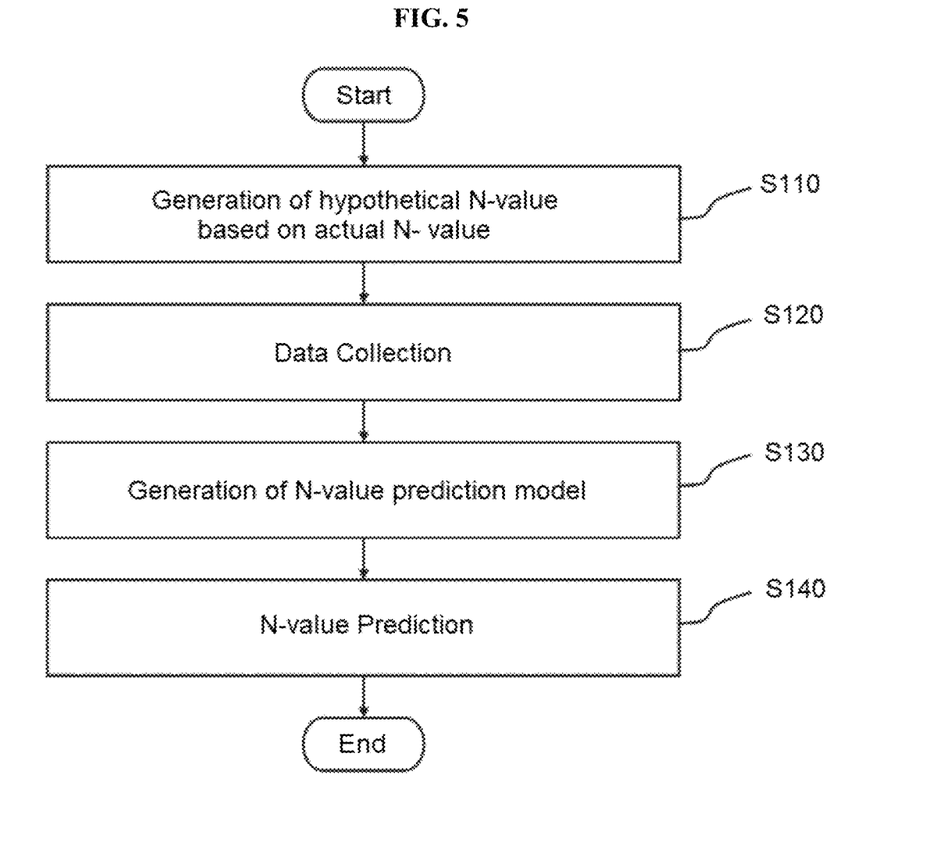
FIG. 5 is a flowchart roughly explaining the method of N-value prediction using artificial intelligence according to an embodiment of the present invention.

In FIG. 5, a flowchart roughly explaining the method of N-value prediction using artificial intelligence according to an embodiment of the present invention is illustrated. Since the method of N-value prediction using artificial intelligence illustrated in FIG. 5 uses the N-value prediction apparatus using artificial intelligence illustrated in FIG. 1, the method of N-value prediction using artificial intelligence according to an embodiment of the present invention may be explained in reference to FIG. 5 along with FIG. 1.

When referring FIG. 1 to FIG. 5, the method of N-value prediction using artificial intelligence according to an embodiment of the present invention may, Obtain the actual N-value, which is the ground characteristic data at one or more drilling points obtained by ground investigation through drilling, and include a stage (S110) where hypothetical N-values are generated by data augmentation based on thereon, a data collecting stage (S120) where the actual N-values and the hypothetical N-values generated from the actual N-values in the memory device, an N-value prediction model generating stage (S130) where the N-value prediction models are generated by learning the collected actual and hypothetical N-values in the N-value prediction model learning unit (137), an N-value prediction stage (S140) where the N-values are predicted using the N-value prediction models generated through the N-value prediction model generating stage (S130).

In the stage (S110) where hypothetical N-values are generated, the data augmentation (or expansion) based on the actual N-value data, which is ground characteristic data obtained by drilling at a drilling point, is executed in the data augmentation unit for the hypothetical learning (133) generating a number of hypothetical N-values. Here, data augmentation refers to the tasks which increase the number of input data sets to secure higher accuracy at the stage of artificial intelligence (machine-learning tasks) learning, and modify the input data to secure higher accuracy with variant data, and in a broad sense, it may be included in preprocessing operations.

In the stage where hypothetical N-values are generated, by generating hypothetical N-values according to preset locations based on the labeled information of the actual N-value, at least one hypothetical value may be generated. Here, as an example, a circular augmentation may be used in generating hypothetical data. The circular augmentation sets up multiple hypothetical points radially, in which 8 hypothetical points in a radius of 0.5 m, 12 hypothetical points in a radius of 1 m, and 16 hypothetical points in a radius of 2 m can be set up centering around the actual borehole at the drilling point. Accordingly, 36 hypothetical N-values are additionally generated by one actual N-value in the borehole. Namely, if 16 actual N-values depending on the depths can be obtained with one borehole, 320 actual N-values may be obtained with 20 boreholes, hereby securing a total of 11,840 N-values big data in accordance with the following equation.

In the data collecting stage (S120), the actual N-value obtained by ground investigation through drilling and the hypothetical N-values generated based on thereon may be stored in the memory device and constructed in the database. The ground characteristic data stored in the database includes the actual location information (latitude, longitude, altitude, depth) and soil information at the actual point where the N-value is measured, similarly, it includes information corresponding to the hypothetical N-values generated in correspondence with the hypothetical points based on the actual location information. After the database, where the ground characteristic data is stored through the data collecting stage (S120), is constructed, the N-value prediction model generating stage (S130) may be performed.

In the N-value prediction model generating stage (S130), N-value prediction models to predict the N-value at arbitrary predicted points are generated. The N-value prediction model generating stage (S130) can be generated since the ground characteristic data stored in the database is learnt in the N-value prediction model learning unit (137). The artificial intelligence used in the N-value prediction model learning unit (137) uses the actual N-value and the hypothetical N-values that are transferred from the database through the control unit (130), and the ground characteristic data corresponding to the hypothetical points. After the N-value prediction models are generated through the N-value prediction model generating stage (S130), the N-value prediction stage (S130) may be performed.

In the N-value prediction stage (S140), the N-values are predicted using the N-value prediction models generated through the prediction model generating stage (S130). The N-value prediction stage (S140) is performed by the N-value prediction models predicting the N-value corresponding to the prediction condition input through the input unit (110). In the present embodiment, it is described that the input prediction conditions for the N-value prediction are the location information (latitude, longitude, depth) and the soil of the ground at the point where the N-value thereof may be predicted. The predicted N-value data derived from the N-value prediction models is processed in the control unit (130) and output through the output unit (120) for the user to check.

Although the present invention is described by an embodiment, the present invention is not limited thereto. The embodiment may be modified and changed within the spirit and scope of the present invention, and those skilled in the present technical field may understand that such modifications and variations also belong to the present invention.

What is claimed is:

1. An N-value prediction apparatus, comprising;
  a hypothetical learning data augmentation unit, based on an actual N-value measured at an actual location according to the Standard Penetration Test through drilling investigation, generating at least one of hypothetical N-values corresponding to a preset hypothetical point based on the actual location;
  an N-value prediction model learning unit learning ground characteristic data corresponding to each of the actual location and the hypothetical point by artificial intelligence, the ground characteristic data including the actual N-value and the hypothetical N-values; and
  an N-value prediction result calculation unit predicting an N-value at an arbitrary prediction target point by using an N-value prediction model generated by artificial intelligence learning executed in the N-value prediction model learning unit,
  wherein the hypothetical learning data augmentation unit uses circular augmentation where multiple hypothetical points are set up radially in a certain distance centering the actual location-,
  wherein the multiple hypothetical points consist of 8 points in a radius of 0.5 m, 12 points in a radius of 1 m, and 16 points in a radius of 2 m centering around the actual location.

2. The N-value prediction apparatus of claim 1, wherein the ground characteristic data includes a location information and a soil information corresponding to the actual location and the hypothetical point.

3. The N-value prediction apparatus of claim 2, wherein the location information includes at least one of latitude, longitude, altitude, depth, and an absolute position based on depth and altitude.

4. The N-value prediction apparatus of claim 2, wherein the N-value prediction model learning unit uses an artificial intelligence learning structure constructed by at least one of automatic machine learning technique, decision tree technique, and artificial neural network technique, which contains an input layer, an output layer, and at least one hidden layer built between the input layer and the output layer, and
  the N-value prediction model learning unit is repeatedly learnt by the said artificial intelligence learning structure so that the location information and the soil information corresponding to the actual location and the hypothetical point is input in the input layer, and the actual N-value or hypothetical N-value is output in the said output layer.

5. The N-value prediction apparatus of claim 4, wherein a learning through the artificial intelligence learning structure selects one technique with the minimum error value with the application of the Mean Absolute Percentage Error (MAPE).

6. The N-value prediction apparatus of claim 1, wherein the N-value prediction result calculation unit outputs a predicted N-value derived from the input of a location information of the prediction target point and an actual N-value at a ground corresponding to the prediction target point by using the N-value prediction model.

7. An N-value prediction method, comprising;
based on an actual N-value measured at an actual location according to the Standard Penetration Test through drilling investigation, generating at least one of hypothetical N-values corresponding to a preset hypothetical point based on the actual location;
learning ground characteristic data corresponding to each of the actual location and the hypothetical point by artificial intelligence, the ground characteristic data including the actual N-value and the hypothetical N-values; and
predicting an N-value at an arbitrary prediction target point by using an N-value prediction model generated in learning by artificial intelligence,
wherein in generating at least one of hypothetical N-values, circular augmentation where multiple hypothetical points are set up radially in a certain distance centering the actual location is used,
wherein the multiple hypothetical points consist of 8 points in a radius of 0.5 m, 12 points in a radius of 1 m, and 16 points in a radius of 2 m centering around the actual location.

8. The N-value prediction apparatus of claim 7, wherein the ground characteristic data includes a location information and a soil information corresponding to the actual location and the hypothetical point.

9. The N-value prediction apparatus of claim 8, wherein the location information includes at least one of latitude, longitude, altitude, depth, and an absolute position based on depth and altitude.

* * * * *